Oct. 30, 1956    P. BJERRE    2,768,773
GRAIN DRILL

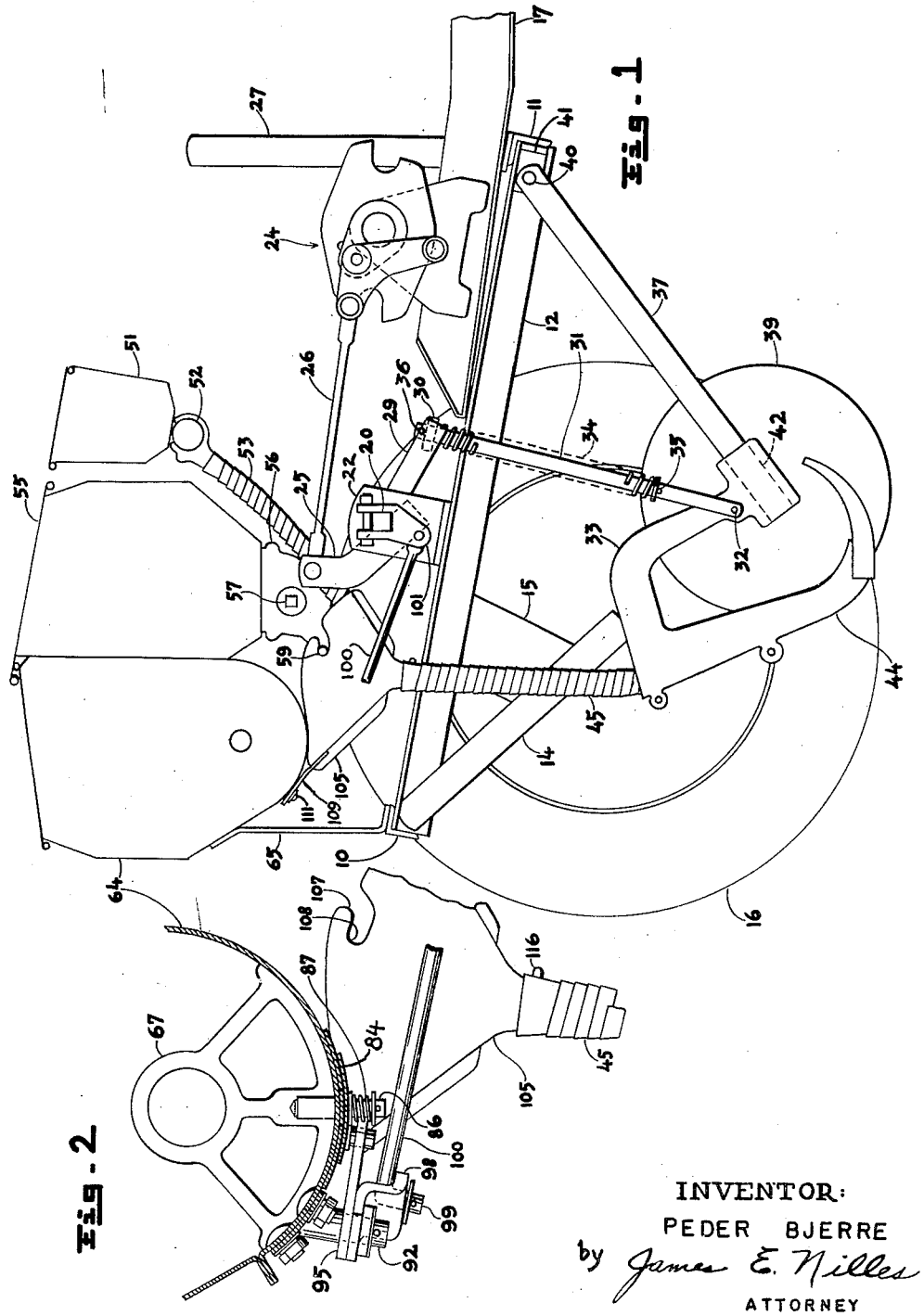

Filed May 27, 1954    3 Sheets-Sheet 2

INVENTOR:
PEDER BJERRE
by James E. Nilles
ATTORNEY

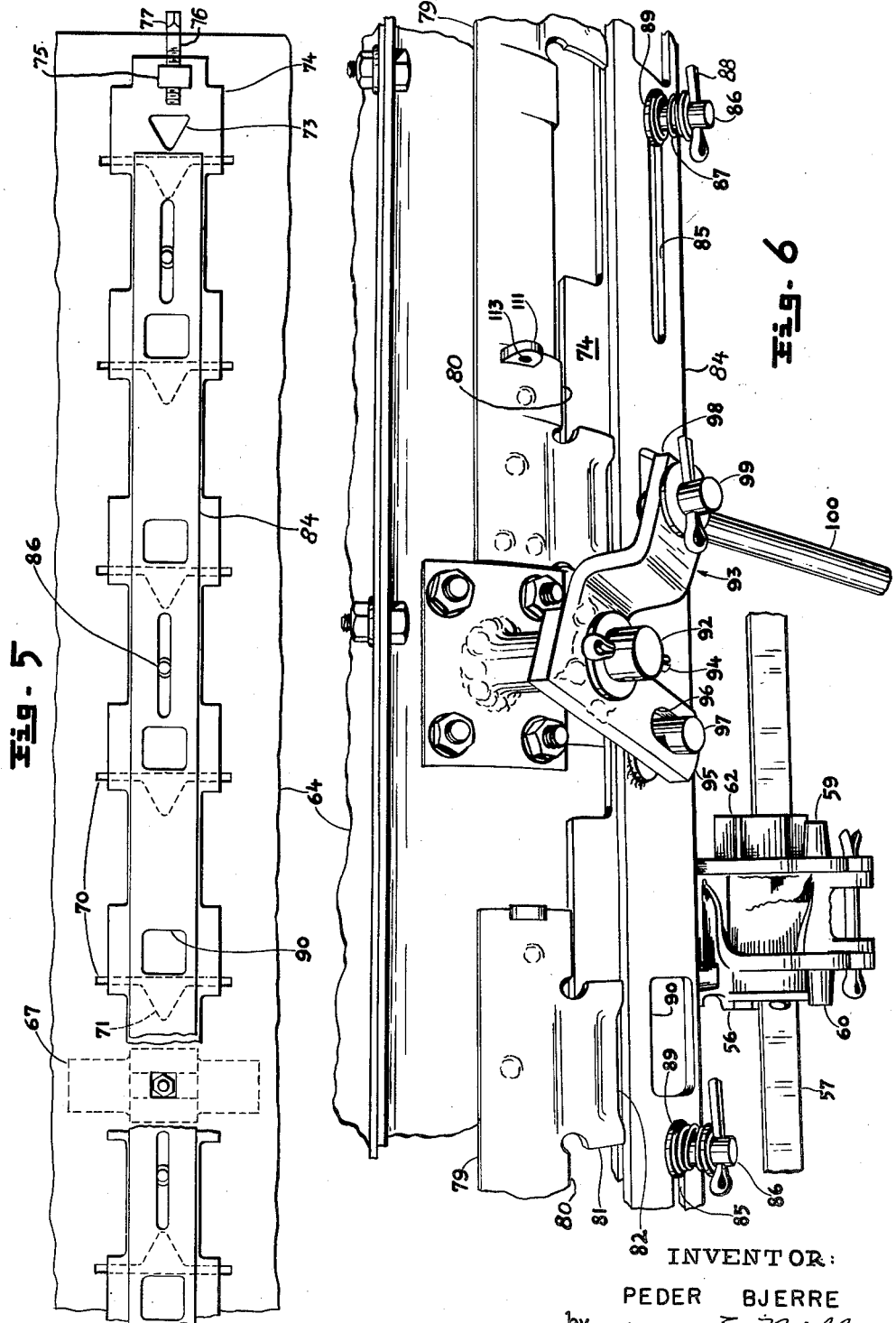

United States Patent Office 2,768,773
Patented Oct. 30, 1956

2,768,773

GRAIN DRILL

Peder Bjerre, Toronto, Ontario, Canada, assignor to Massey-Harris-Ferguson Limited, Toronto, Ontario, Canada, a corporation of Canada Application May 27, 1954, Serial No. 432,807

2 Claims. (Cl. 222—485)

This invention relates to planters or spreaders and finds particular utility in grain drills of the type having a combination of hoppers containing different materials such as fertilizer, grain and grass seeds of various types.

An object of this invention is to provide means which will stop the flow of material from the hopper without disturbing the metering setting of the hopper.

It is a general object of this invention to provide an improved grain drill which is highly efficient in operation and easily assembled and disassembled for cleaning and adjusting purposes.

Other objects and advantages will become more apparent as this disclosure progresses, reference being had to the following drawing in which:

Figure 1 is an elevational end view of the improved drill with the near wheel and certain parts removed for the sake of clarity.

Figure 2 is a fragmentary, sectional view, on an enlarged scale, of the fertilizer hopper bottom showing the metering shutter and the cut-off shutter.

Figure 5 is a fragmentary, bottom view of the fertilizer hopper showing the relationship between the discharge ports in the hopper bottom, metering shutter and the cut-off shutter.

Figure 6 is a perspective view from the rear and bottom of the machine, on an enlarged scale, showing the metering shutter and the cut-off shutter and part of the actuating means for the latter.

Figure 3:
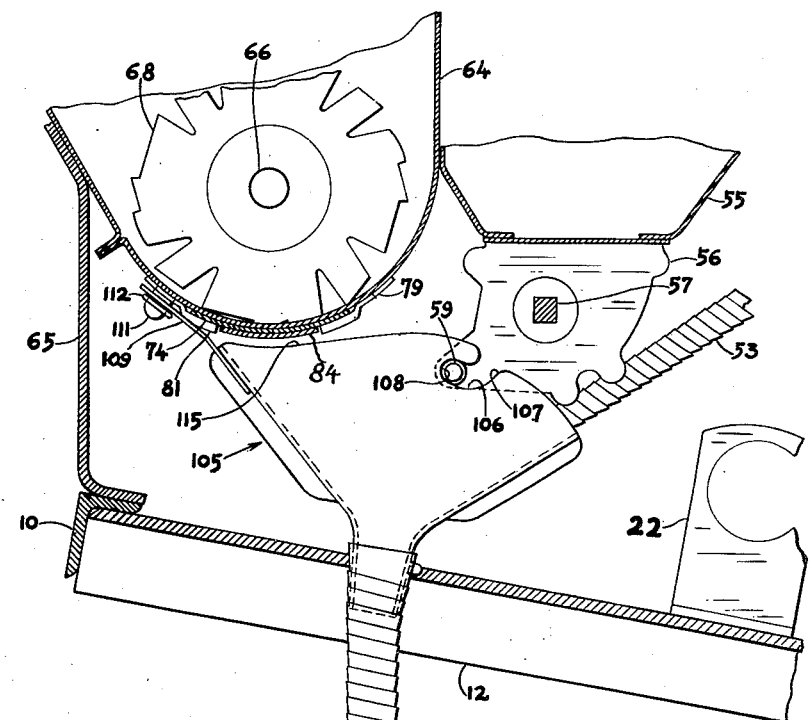
Figure 3 is a fragmentary, sectional view, on an enlarged scale, showing the conductor funnel attached to the hoppers.
Figure 4:
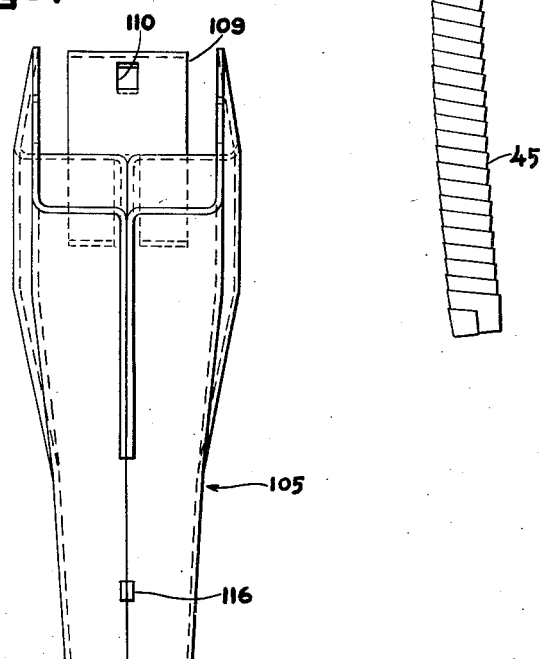
Figure 4 is a front, elevational view, on a further enlarged scale, of the conductor funnel.

Referring now more specifically to the drawings, particularly Figure 1, the main frame of the machine comprises a rear member 10, a front member 11, and end members 12 only the far one of which is shown. This frame is supported in ground traversing position by crank axles 14 which are secured to frame member 10 at the upper end and to end members 12 by means of struts 15. A ground engaging wheel 16 is rotatably mounted on the lower end of each crank axle 14. Hitch frame members 17, of which there are two, are secured to the main frame at spaced locations and converge at their forward ends where they are adapted to be attached to a tractive vehicle.

A rock shaft 20 is mounted in conventional bushings (not shown) which are rotatably mounted in the supports 22 spaced along the frame of the machine. A conventional half-turn, power lift clutch 24 is secured to intermediate frame members (not shown) which extend between and are attached to front and rear frame members 11, 10 respectively. Secured to rockshaft 20 is an arm 25 which is connected to the clutch 24 by rod 26. The clutch 24 is actuated in the well-known manner by holding the hand lever 27 in momentary disengagement with the clutch, causing the latter to make a half revolution. The rockshaft 20 is thus oscillated in alternate directions to raise or lower the seed placing mechanism to be described and which is also of conventional nature. Also secured to rockshaft 20 at spaced locations thereon, are bifurcated arms 29 between which are pivotally mounted blocks 30 having an aperture therein through which slidably extend rods 31. Rods 31 are pivotally secured at their lower ends, as at 32, to the seed boot frame 33, and their upper ends extend through blocks 30 as mentioned, and have a pin 36 at their upper end which prevents the rods 31 from becoming disengaged from block 30, yet allows them to slide upwardly therethrough. A spring 34 is held between pin 35, in the lower part of rods 31, and blocks 30, thus urging the seed boot frame 33 into yielding contact with the ground. Drag rods 37 support the seed boot frame 33 and disk openers 39 and permit them to rise and fall about point 40 where rods 37 are pivotally attached to brackets 41 spaced along frame member 11. The lower end of drag rod 37 extends through a hole 42 in boot frame 33 and is rigidly secured therein. The rearward, vertically extending portion 44 of the conventional boot frame 33 is hollow through which passes the grain, fertilizer and seeds delivered to it by the flexible conductor tube 45.

The grass seed hopper 51 has the conventional distributor wheels 52 which feed the seed into tubes 53 when the machine is in operation. The grain hopper 55 has attached at its bottom at spaced locations along its length, distributor wheel housings 56 through which extends the distributor wheel drive shaft 57 which rotates only when the machine is in operation. Housings 56 have a projection, or ears, 59, 60 on each side thereof for purposes which will hereinafter appear. The distributor wheel 62 (Fig. 6) meters grain from the hopper 55 through the bottom of the housing 56.

The fertilizer hopper 64, grain hopper 55 and grass hopper 51 are all secured to the main frame by suitable braces, only one of which, 65, is shown. Hopper 64 has a shaft 66 extending longitudinally therein and supported by braces 67 which are secured, at spaced intervals within the hopper 64. Feeding discs 68 (Fig. 3) are mounted at spaced locations on shaft 66 and are rotated thereby. These discs 63 penetrate the bottom of the hopper 64 by rotating through slots 70 (Fig. 5) in the bottom of the hopper. Slots 70 have a triangular shaped opening 71 extending from one side which is registerable in varying degrees, with the triangular shaped opening 73 (only one shown) in metering shutter 74. Shutter 74 is slidably adjustable in a longitudinal direction along the hopper bottom by means of a threaded block 75 secured to shutter 74 which receives a threaded shaft 76 having a square end portion 77 for receiving an adjusting crank. Guide members 79 are secured, as by spot welding, to the hopper bottom on either side of shutter 74, and have edge portions 80 which abut against the edges of shutter 74 so as to guide the latter in its sliding movement. Guides 79 also have raised portions 81 which are indented slightly, as at 82, to form a bearing surface which holds shutter 74 against the hopper bottom.

Slidably mounted against and beneath metering shutter 74, is the cut-off shutter 84 which together with shutter 74 have a series of registering guide slots 85 through which extend pegs 86. Pegs 86 are secured to the underside of the hopper bottom and springs 87 are retained on pegs 86 by means of cotter keys 88 and also bear against washers 89. The shutter 84 is thus spring biased against the shutter 74 permitting relative movement between the shutters yet close fitting engagement therebetween. Shutter 84 has a series of rather large feed openings 90 which are registerable with feed openings 70—71 when the machine is delivering fertilizer or, alternatively, as in Fig. 5, in the cut-off position when the machine is not operating to deliver material. The shutter 84, by means to be described, can be moved relative to shutter 74, to either prevent flow of material or permit such flow, without interfering with the setting of the meter shutter 74, which is changed infrequently.

Secured to the bottom of hopper 64 is a downwardly depending post 92 having a bell crank 93 pivotally mounted thereon and easily removable therefrom by removing cotter key 94. The arm 95 of the bell crank has a slot 96 therein in which fits a lug 97 secured to shutter 84. To the other arm 98 is pivotally attached in a hole therethrough, a hook portion 99 of rod 100. Rod 100 is connected at the other end to a clamp 101 which is rigidly secured to rockshaft 20. Thus the shutter 84 is moved to the "on" or "off" position by movement of the rockshaft and depending whether the seed placing unit is in the operative or inoperative position respectively.

The conductor funnel 105 is designed for quick and easy attachment to, or detachment from, the drill which facilitates frequent cleaning of the machine and in particular the fertilizer hopper and shutter means. The funnel is fabricated from sheet steel and is comprised of complementary halves which are secured together as by welding. On either side of the funnel and along the top forward edge thereof are notches 106 having an inlet portion 107 and a holding portion 108 which snugly receive ears 59, 60 of housing 56. The rear end of the funnel has secured thereto a strap 109 which extends rearwardly under the hopper 64 and has an aperture 110 in the rear end thereof. A lug 111 for each funnel is secured to guides 79 and fits into the aperture 110 of strap 109. The funnel is retained in the position shown in Figure 1 by a cotter key 112 which is quickly removable from the hole 113 (Fig. 6) in the lug 111.

The funnel can thus be quickly removed from the hopper, to facilitate cleaning the machine, by withdrawing pin 112 and lowering the rear end of funnel 105 whereupon the funnel will fall away from the ears 59, 60. As shown in Figure 3, the top edge 115 of funnel 105 is curved so as to fit closely under the cut-off shutter 84 and avoid any loss of material but at the same time allow the shutter 84 to move freely. The conductor tube 53 for the grass seed hopper deposits its seed into the forward portion of the funnel. A small knob-like protrusion 116 on the lower and forward side of the funnel extends through a hole in the flexible tube and retains it in place.

Having thus shown and described the invention, what is desired to be secured by Letters Patent is:

1. In a material spreader; a hopper having a series of openings longitudinally spaced along the bottom thereof, a metering shutter slidably mounted to said hopper and having a series of feed openings registerable with said hopper openings in varying degrees, a cut-off shutter slidably mounted on said metering shutter for movement relative thereto in a longitudinal direction and having a series of feed openings registerable with said hopper openings, said metering and cut-off shutters each having a plurality of registering guide slots, pegs mounted on said hopper and extending downwardly therefrom through said slots to hold said cut-off shutters against said metering shutter for slidable engagement relative thereto.

2. In a material spreader having an elongated hopper with a plurality of openings longitudinally spaced along the bottom thereof, a metering shutter slidably mounted in a longitudinal direction on said hopper bottom and having a plurality of feed openings registerable with said hopper openings, a cut-off shutter slidably mounted on said metering shutter for movement relative thereto in a longitudinal direction and having a plurality of feed openings registerable with said hopper openings, said shutters having registering longitudinally arranged slots therethrough, a peg secured to said hopper and extending downwardly through said slots, a spring mounted on said peg and bearing against said cut-off shutter to urge the latter toward said hopper.

References Cited in the file of this patent

UNITED STATES PATENTS

| Re. | 2,640 | Penn et al. | June 4, 1867 |
|---|---|---|---|
| | 33,664 | Richmond | Nov. 5, 1861 |
| | 35,636 | Thomas et al. | June 17, 1862 |
| | 37,712 | Thomas et al. | Feb. 17, 1863 |
| | 105,690 | Ingels | July 26, 1870 |
| | 176,965 | Kuhns et al. | May 2, 1876 |
| | 241,924 | Buswell | May 24, 1881 |
| | 256,404 | Straughn | Apr. 11, 1882 |
| | 728,492 | Norris | May 19, 1903 |
| | 770,245 | Roby | Sept. 13, 1904 |
| | 1,206,438 | Hoffman | Nov. 28, 1916 |
| | 1,418,169 | Printz | May 30, 1922 |
| | 1,888,821 | Fearn | Nov. 22, 1932 |
| | 2,346,459 | Schill | Apr. 11, 1944 |
| | 2,624,492 | Seltzer | Jan. 6, 1953 |
| | 2,678,145 | Juzwiak et al. | May 11, 1954 |